(12) United States Patent
Plavetich (10) Patent No.: US 7,950,728 B2
(45) Date of Patent: May 31, 2011

(54) TABLE ASSEMBLIES FOR A VEHICLE

(75) Inventor: Richard Plavetich, San Diego, CA (US)

(73) Assignee: Nissan North America, Inc., Franklin, TN (US)

(*) Notice: Subject to any disclaimer, the term of this patent is extended or adjusted under 35 U.S.C. 154(b) by 276 days.

(21) Appl. No.: 12/264,045

(22) Filed: Nov. 3, 2008

(65) Prior Publication Data

US 2010/0109381 A1    May 6, 2010

(51) Int. Cl.
B60P 3/34 (2006.01)

(52) U.S. Cl. ............... 296/193.01; 296/37.6; 296/26.15; 296/22; 296/24.36; 108/44

(58) Field of Classification Search ............. 296/193.01, 296/193.05, 26.01, 26.03, 26.08, 26.06, 26.11, 296/26.12, 26.15, 57.1, 24.36, 50, 56, 37.1, 296/37.6, 146.1, 151, 147, 152, 146.11, 146.12, 296/186.4, 22; 108/44
See application file for complete search history.

(56) References Cited

U.S. PATENT DOCUMENTS

| | | | |
|---|---|---|---|
| 3,191,400 A | | 6/1965 | Swenson |
| 5,137,321 A | | 8/1992 | Landry et al. |
| 5,468,037 A * | 11/1995 | Peterson et al. ............. 296/57.1 |
| 5,575,521 A * | 11/1996 | Speis ........................ 296/57.1 |
| 6,302,465 B1 * | 10/2001 | Faber et al. .................. 296/39.1 |
| 6,338,519 B2 * | 1/2002 | Decker et al. ................ 296/57.1 |
| 6,644,708 B1 * | 11/2003 | Grzegorzewski et al. ...... 296/32 |
| 6,779,824 B1 * | 8/2004 | Lazarevich et al. ............. 296/50 |
| 7,188,881 B1 * | 3/2007 | Sturt et al. .................... 296/26.1 |
| 7,207,616 B2 * | 4/2007 | Sturt .............................. 296/26.1 |
| 7,354,090 B1 * | 4/2008 | Pomorski .................... 296/26.11 |
| 7,562,925 B2 * | 7/2009 | Henderson et al. .......... 296/37.6 |
| 7,588,278 B1 * | 9/2009 | Luneack ..................... 296/24.32 |
| 7,628,439 B1 * | 12/2009 | Strong ........................ 296/26.03 |
| 2008/0231076 A1 * | 9/2008 | Plavetich .................... 296/183.1 |
| 2009/0021039 A1 * | 1/2009 | Quigley et al. ............. 296/57.1 |
| 2010/0109381 A1 * | 5/2010 | Plavetich ................. 296/193.01 |

FOREIGN PATENT DOCUMENTS

| | | |
|---|---|---|
| DE | 3916940 A1 * | 11/1990 |
| EP | 0454933 B1 | 11/1991 |
| GB | 985435 | 3/1965 |

* cited by examiner

*Primary Examiner* — Glenn Dayoan
*Assistant Examiner* — Gregory Blankenship
(74) *Attorney, Agent, or Firm* — Young Basile

(57) ABSTRACT

Disclosed herein are embodiments of vehicles having table assemblies. One embodiment of a vehicle comprises a vehicle body structure, a support member, and a table member. The vehicle body structure defines at least a portion of a compartment and has an opening permitting access to the compartment. The support member is coupled to the vehicle body structure to move from an interior position in which the support member is substantially inboard of the compartment, to an exterior position in which at least a portion of the support member moves through the opening to a location outboard of the vehicle body structure. The table member is coupled to the support member to move from a first position in which the table member is located inboard of the vehicle body structure, to a second position in which the table member is located outboard of the vehicle body structure.

32 Claims, 8 Drawing Sheets

TABLE ASSEMBLIES FOR A VEHICLE

FIELD OF THE INVENTION

The present invention relates to the field of table assemblies for use both in the interior and exterior of vehicles.

BACKGROUND

The motor vehicle industry continues to provide new features for both recreational and work vehicles in response to the changing needs of consumers. Users of recreational and work vehicles desire comforts within the vehicle while traveling. Examples of such comforts include swiveling seats, tables, cup holders, DVD players, etc. Many of these consumers also use their vehicles while parked. For example, many work trucks are essentially traveling offices that visit numerous work sites. The vehicle is used as an office to make phone calls, complete paperwork, deliver goods, collect goods, etc. Others are used to sell items directly to the public, such as food or beverages. Recreationally, vehicles are used, for example, at sporting events and concerts. Although amenities have been added to such vehicles to make work easier to conduct or recreation easier to set up, the amenities are typically for use only exclusively inside the vehicle or exclusively outside the vehicle. Furthermore, those for use outside the vehicle must be stored, taking up valuable cargo space, and brought outside of the vehicle for set-up outdoors. This can be time consuming and difficult.

SUMMARY

Disclosed herein are embodiments of table assemblies for a vehicle. One embodiment of a table assembly comprises a vehicle body structure defining at least a portion of a compartment, the vehicle body structure having an opening permitting access to the compartment. The table assembly also comprises a support member coupled to vehicle body structure and configured and arranged to move from an interior position in which the support member is substantially inboard of the vehicle body structure, to an exterior position in which at least a portion of the support member moves through the opening to a location outboard of the vehicle body structure. A table member is coupled to the support member and configured and arranged to move from a first position in which the table member is located inboard of the vehicle body structure, to a second position in which the table member is located outboard of the vehicle body structure.

Another embodiment of a table assembly for a vehicle comprises a vehicle body structure and a table member coupled to the vehicle body structure and configured and arranged to move from a first position in which a distal end of the table member is located substantially inboard of the vehicle body structure, to a second position in which the distal end of the table member is located outboard of the vehicle body structure.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
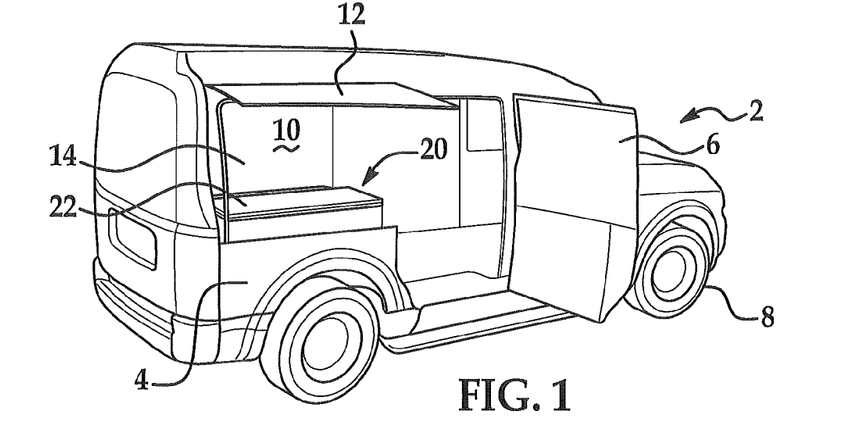
FIG. 1 is a perspective view of an embodiment of a vehicle with a table assembly in an interior and first position.
Figure 2:
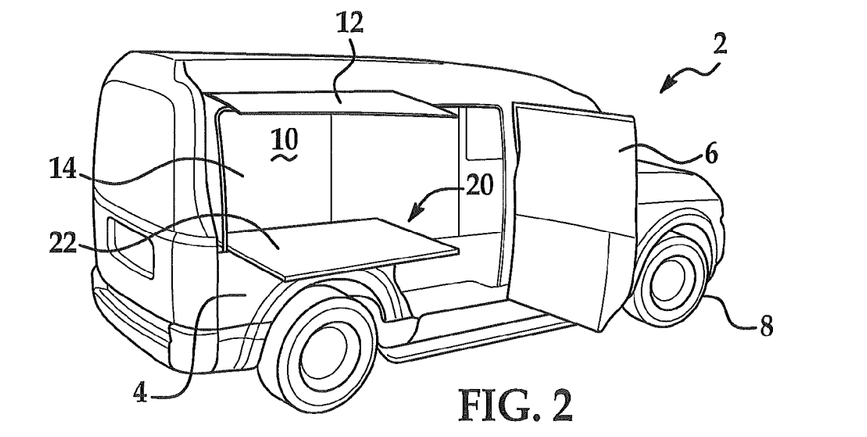
FIG. 2 is a perspective view of an embodiment of a vehicle with a table assembly in a second and exterior position.

FIGS. 1 and 2 illustrate an embodiment of a table assembly for a vehicle. The vehicle 2 has a vehicle body 4 or body structure and is shown here with at least one side door 6 and four wheels 8. It should be understood that the vehicle 2 disclosed herein is not limited to this configuration, and can be any vehicle incorporating a compartment 10. As used herein, compartment 10 can be any space configured to contain cargo or passengers, including open-topped cargo areas and closed cargo spaces. In addition, vehicle 2 is not limited to this door configuration and may have other door configurations. For example, the vehicle 2 may be a van with a sliding door on one or both sides, or the vehicle 2 may be one with only a single driver's side door or one with both a driver's side door and a passenger side door, such as a pickup truck or a delivery truck. The vehicle is also not limited to four wheels, and may have more or less wheels depending on the type of vehicle or its use.

The vehicle 2 in FIGS. 1 and 2 is shown with an awning 12 that, when opened, provides an opening 14 through which to reach the compartment 10 from the outside or reach the outside from the compartment 10. When closed, the awning 12 and at least the body 4 enclose the compartment 10. The awning 12 and opening 14 are shown in FIGS. 1 and 2 on the side of the vehicle 2. It is contemplated that the awning 12 and opening 14 can be on either side of the vehicle and/or the back of the vehicle 2. It is also contemplated that the awning 12 can instead be a closure panel such as one or more doors or windows. Non-limiting examples include double doors that swing open from the center to expose the opening 14, an accordion door that slides open to expose the opening 14, a single door that slides to one side to expose the opening 14, and a window that slides to one side to expose the opening 14. The closure panel can be movable between open and closed positions to conceal the opening 14 when in the closed position.

The size of the opening 14 can vary depending on the vehicle and the intended use of the opening 14. The opening 14 should be sufficiently large to allow for the table assemblies disclosed herein to be moved through. Although the opening 14 is not intended for passenger entry or exit, the size of the opening 14 may allow for such.

The body 4 of the vehicle 2 shown in FIG. 1 encloses at least a portion of the compartment 10. The awning 12, when opened, permits access to the compartment 10 through the opening 14. A table assembly 20 including a support member (not seen in FIG. 1) and a table member 22 is illustrated in FIGS. 1 and 2. The table assembly 20 functions as a usable surface both inside and outside of the vehicle 2 and is easily and quickly transferred from inboard of the vehicle to outboard of the vehicle. The table assembly 20 is shown in a position inboard the vehicle 2 in FIG. 1. The table assembly 20 is shown in a position outside of the vehicle 2 in FIG. 2. Embodiments of vehicles 2 with the table assembly 20 will be discussed in more detail below.

Figure 3:
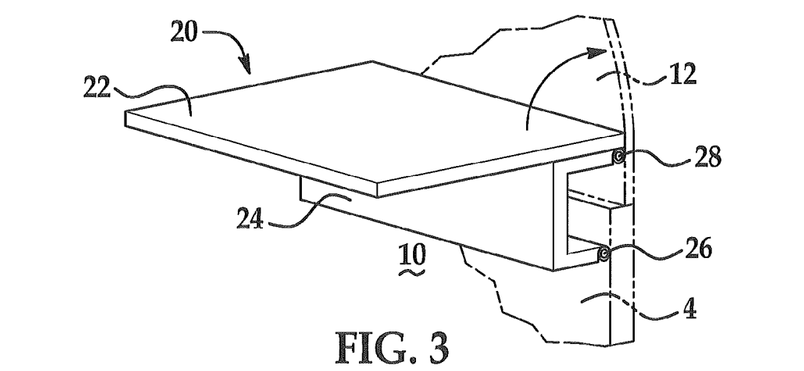
FIG. 3 is a perspective detail of an embodiment of a table assembly in a first and interior position.
Figure 4:
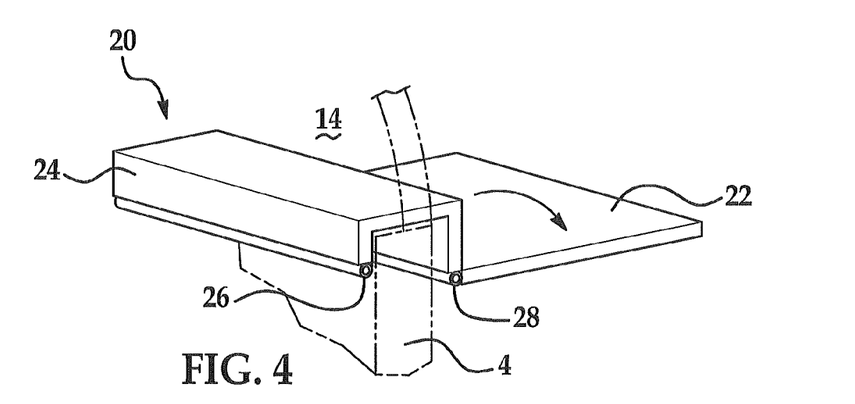
FIG. 4 is a perspective detail of an embodiment of a table assembly in a second and exterior position.

One embodiment of the table assembly 20 is shown in FIGS. 3 and 4. FIG. 3 is a perspective detail of the table assembly 20 shown in FIG. 1 inboard of the vehicle 2. The table assembly 20 has a table member 22 and a support member 24. In FIG. 3, the support member 24 is shown in an interior position in which the support member 24 is substantially inside the compartment 10. Substantially inside is enough to support the table member 22 in a useful position. The awning 12 is shown in the closed position; however, the awning can be opened in this position as well. In this embodiment, the support member 24 can be coupled to the body 4 by a first pivot 26. As used herein, the term "pivot" includes any mechanism that moves the support member 24 in a circular, rectilinear, or eccentric path relative to an axis. Non-limiting examples include a hinge and a coupler. The support member 24 can move about the first pivot 26 from the interior position inboard the vehicle to an exterior position in which at least a portion of the support member 24 moves through the opening 14 to a location outboard of the vehicle. FIG. 4 is a perspective detail of the support member 24 in the exterior position. In FIG. 4, the awning 12 is opened, exposing the opening 14 through which at least a portion of the support member 24 moves.

The table member 22 is coupled to the support member 24. The table member 22 has a first position in which it is located within the compartment 10 in a substantially horizontal orientation. Substantially horizontal orientation is enough to provide a usable surface. A portion of the table member 22 can be in flush engagement with at least a portion of the support member 24 when the table member 22 is in the first position. It is contemplated that the compartment 10 can comprise a storage compartment under the table member 22, such that the table member 22 is configured to cap the storage compartment when the table member 22 is in the first position.

The table member 22 can be coupled to the support member 24 so that it can move from the first position to a second position in which the table member 22 is located outside of the vehicle in a substantially horizontal orientation when the support member 24 has been moved to the exterior position.

In this embodiment, the table member 22 is illustrated coupled to the support member 24 with a second pivot 28. The second pivot 28, like the first, includes any mechanism that moves the support member 24 in a circular, rectilinear, or eccentric path relative to an axis. Non-limiting examples include a hinge and a coupler. It should be noted that the table member 22 can be coupled to the support member 24 by other coupling means. An example of this is detailed with reference to a later described embodiment.

Figure 5:
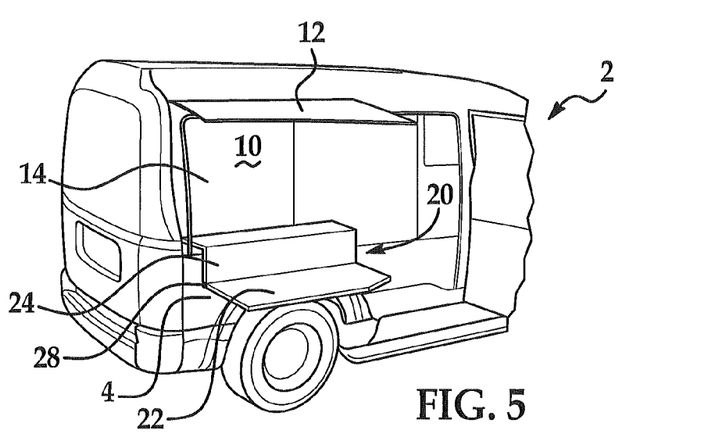
FIG. 5 is a perspective view of another embodiment of a vehicle with a table assembly in a second and exterior position.

FIG. 3 illustrates the support member 24 in the interior position with the table member 22 in the first position. The table member 22 is supported by at least the support member 24 in this position. In FIG. 4, the support member 24 has been rotated around the first pivot 26 to the exterior position and the table member 22 has been rotated approximately ninety degrees around the second pivot 28 into the second position so that it is substantially perpendicular to the first position. In this position, the support member 24 can be supported by a width or bearing surface of the body 4. FIG. 5 illustrates the support member 24 and table member 22 of FIG. 4 as viewed from outside of the vehicle 2.

Figure 6A:
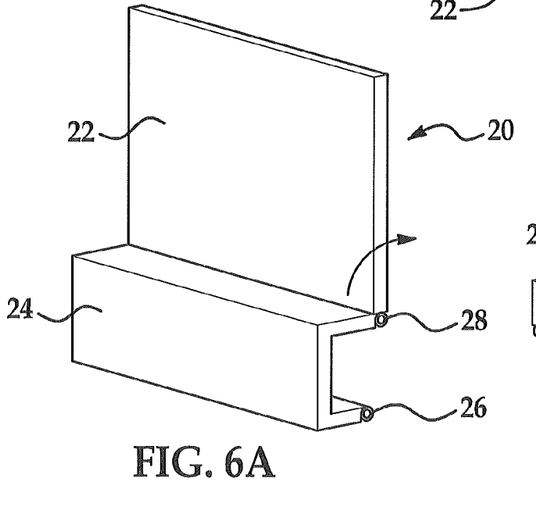
FIG. 6A is a perspective detail of an embodiment of a table assembly in an interior stowage position.

FIG. 6A illustrates the table assembly 20 in a third or stowage position. In the stowage position, the support member 24 can be in the interior position within the vehicle 2. The table member 22 is rotated around the second pivot 28 approximately ninety degrees until it is substantially vertical. Substantially vertical is essentially upright enough to provide clearance in the compartment 10. In the stowage position, the table member 22 is positioned to require the least amount of the compartment when it is not in use. It is contemplated that a securing member (not shown) can be incorporated into the table assembly 20 to assist in maintaining the stowage position during travel. For example, the table member 22 can include a latch or hook that is retained in a retainer such as an eye or S-bolt located on the body 4 or awning 12 in a cooperating position when in the stowage position. Another non-limiting example is a folding hinge that locks in the extended position between the surface 22 and the support member 24 when in the stowage position.

Figure 6B:
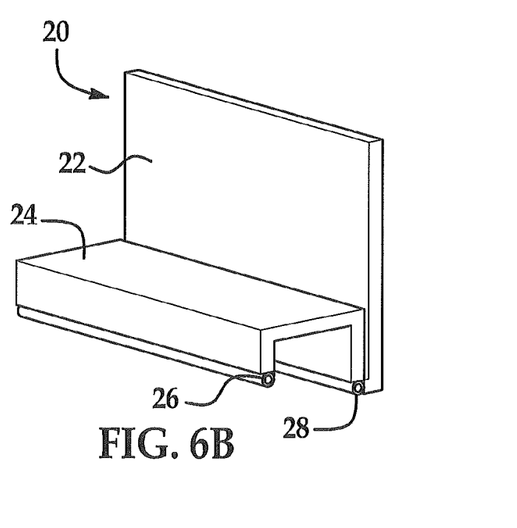
FIG. 6B is a perspective detail of an embodiment of a table assembly in an exterior stowage position.

The table member 22 can also be in a stowage position when the support member 24 is in the exterior position, as shown in FIG. 6B. In this case, the table member 22 can be rotated about the second pivot 28 from the second position approximately ninety degrees to its first position. In this position, with the support member 24 in the exterior position, the table member 22 would be in a substantially vertical orientation and would be effectively stowed to allow for more room when needed outside of the vehicle. Again, although not stored for travel, a securing member can be incorporated into the table assembly 20 to assist in maintaining the vertical orientation of the table member 22. As a non-limiting example, the hook can be on one side of the table member 22 with an eye-bolt in a corresponding position on the side of the support member 24.

The support member 24 in FIGS. 1-6 is shown with three solid sides. This is only provided as an example, and other configurations of the support member 24 are contemplated. As non-limiting examples, the support member 24 may be two substantially planar side surfaces with an arched or rounded base between the two sides, or the support member 24 may comprise a frame and/or brackets rather than comprising the solid, contiguous sides shown. One or more portions of the support member 24 can contain apertures or open patterns, for example, or can be embossed or indented. One or more additional support members are also contemplated where desired or required for the table assembly 20 to provide increased support or additional positioning options.

Figure 7A:
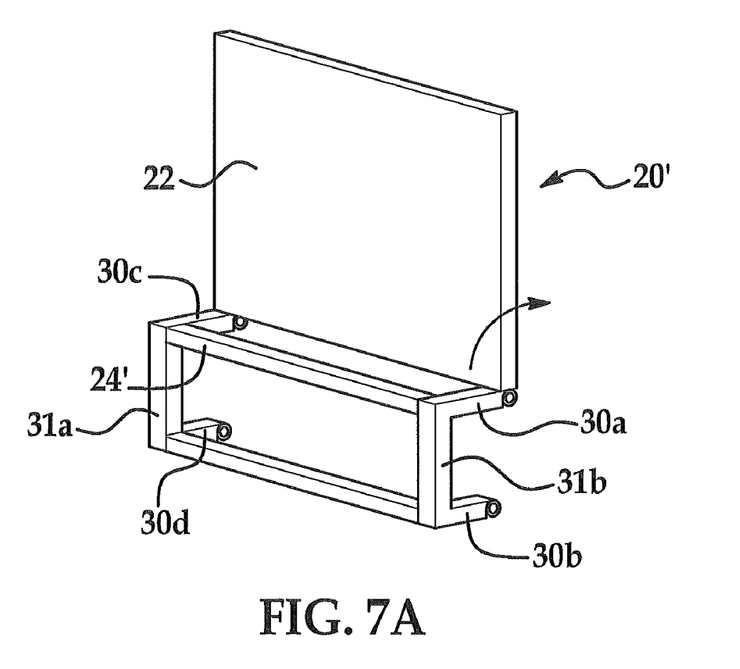
FIG. 7A is a perspective detail of another embodiment of a table assembly in an interior stowage position.

FIG. 7A illustrates an example of a support member 24' comprising a frame. The table assembly 20' with the support member 24' is shown in the third or stowage position for illustration. As shown in FIG. 7A, the support member 24' comprises four horizontal beams in a rectangular configuration. Each end of the support member 24' is connected with three connecting legs of a bracket—two horizontal legs 30a-d on each side and one vertical leg 31a, 31b on each side. This framework is provided as a non-limiting example and other frame configurations are contemplated. As one non-limiting example, the support member can comprise a solid base portion with the remainder of the support comprising a frame. Another example is a frame with only two or three horizontal beams having the three connecting legs. The support member 24' is movably coupled to the body 4 as described with reference to other embodiments disclosed herein.

The table assembly 20' has a table member 22 as described in the other embodiments. The support member 24' and the table member 22 of the table assembly 20' operate and are used in the same manner as described in the other embodiments disclosed herein. The table member 22 is coupled to the support member 24' as described with reference to other embodiments disclosed herein. For brevity, the descriptions will not be repeated.

Figure 7B:
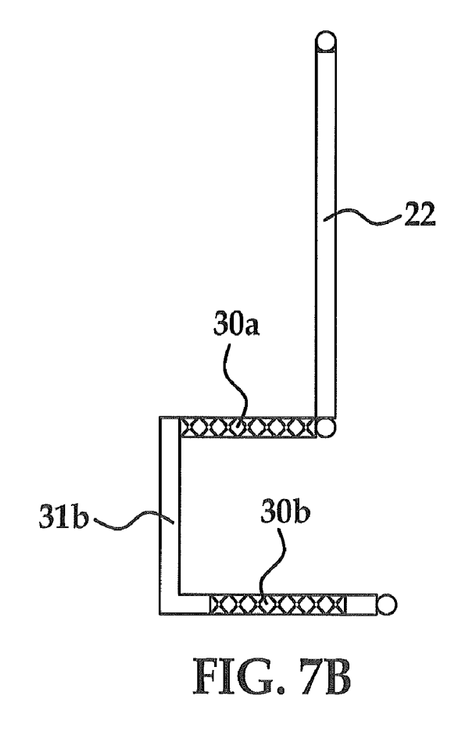
FIG. 7B is a side view of FIG. 7A.
Figure 7C:
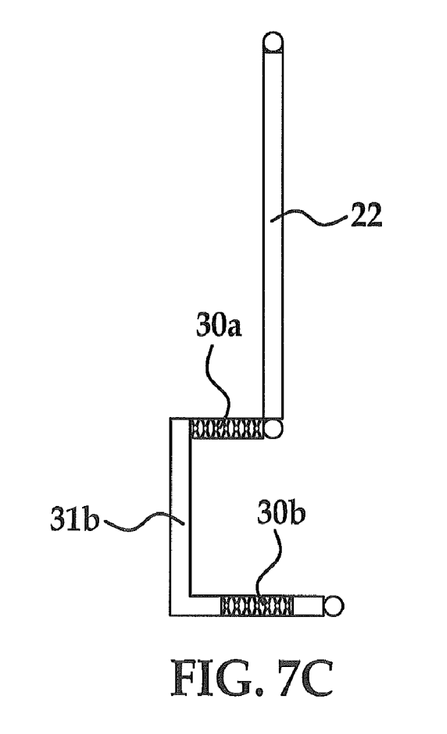
FIG. 7C is a side view of an embodiment of a table assembly in a telescoped stowage position.

FIG. 7B is a side view of the table assembly 20' in FIG. 7A. FIG. 7C shows an additional feature of the embodiment in 7A that includes telescoping legs 30a-d. Only legs 30a and 30b are shown in FIG. 7C. When the table assembly 20' is in the stowage position, the legs 30a-d can be telescoped inward toward the body 4, decreasing the length of the legs 30a-d. This increases the amount of space available in the compartment 10 when the table assembly 20' is not in use. When the table assembly 20' is wanted for use, the legs 30a-30d are elongated to their full length.

Figure 8A:
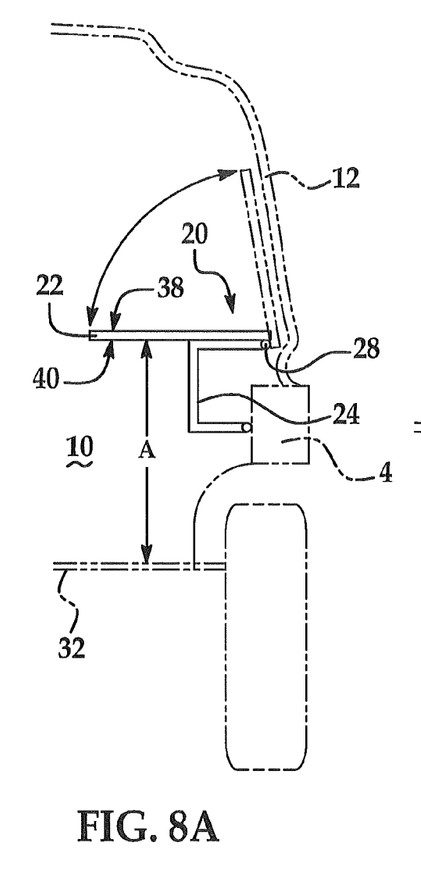
FIG. 8A is a cross sectional view of an embodiment of a vehicle with a table assembly in a first and interior position.
Figure 8B:
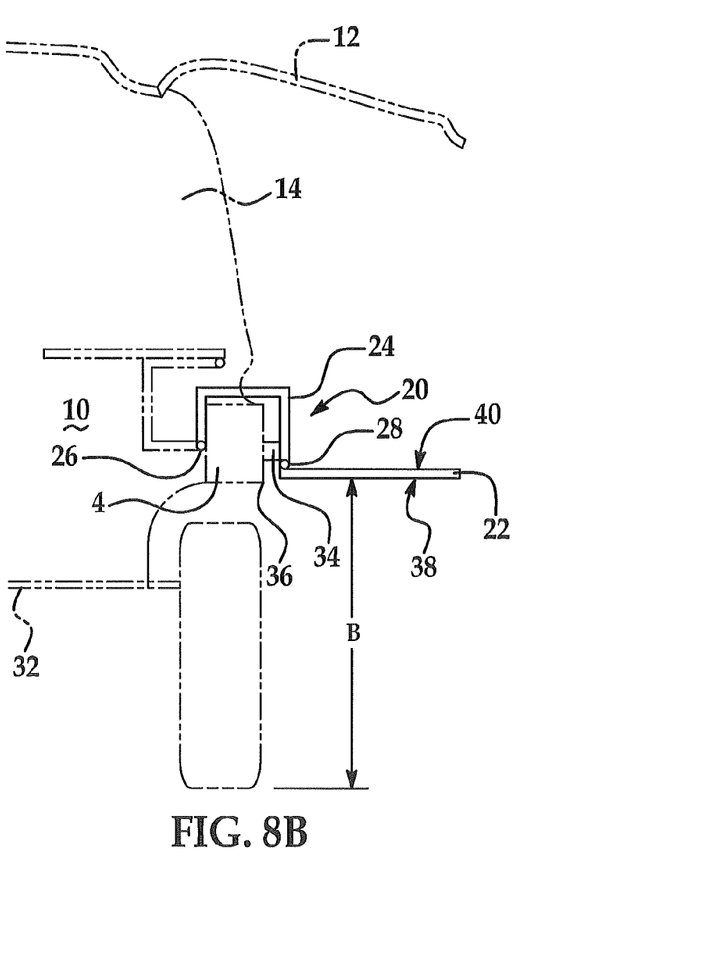
FIG. 8B is a cross sectional view of the embodiment in FIG. 8A with a table assembly in a second and exterior position.

FIGS. 8A and B are cross-sectional views of a portion of the vehicle 2 disclosed herein with an embodiment of the table assembly 20. The body 4 of the vehicle can define a floor 32 of the compartment 10. When the support member 24 is in its interior position and the table member 22 is in its first position, the table member 22 can be configured to rest horizontally within a distance A of the floor. This distance can be, for example, between 25 and 35 inches above the floor 32. Distance A is a height that is comfortable for use. This height is commensurate with typical table seating heights, and the table member 22 can be used as a typical table, for example, with the existing vehicle seats, pillows, folding chairs, and the like. FIG. 8A also shows the movement of the table member 22 around the second pivot 28 to the stowage position.

In FIG. 8B, the awning is shown in the open position, exposing opening 14. The support member 24 can be rotated around the first pivot 26 so that the second pivot 28 moves through the opening 14, the support member 24 coming to rest in its exterior position. The table member 22 rotates approximately ninety degrees about the second pivot 28 until it is in its second position which is substantially perpendicular to its first position and substantially horizontal to the ground so that it is in a useful position. The support member 24 can be configured so that the distance of the table member 22 above grade in the second position is within a distance B. Distance B can be, for example, between 30 and 45 inches above the ground outside of the vehicle 2. In any case, distance B will be greater than distance A. Distance B is a height that is comfortable for use. This height is commensurate with counters or bars and can accommodate, for example, standing, counter stools, bar stools and the like.

FIG. 8B also illustrates the use of a bumper 34. Embodiments herein can incorporate the use of the bumper 34 to protect the exterior side or outer surface 36 of the body 4 from potential scratches or other marks from portions of the support member 24 that might contact the outer surface 36. The bumper 34 can be any material known by those skilled in the art to protect the opposing surfaces from contact. Non-limiting examples include rubber, felt, foam, etc. The bumper is contemplated as being located on a portion of the support member 24; however bumper 34 can be located on the outer surface 36 of the body 4 if desired or required. It is also contemplated that the bumper 34 be removable.

Still referring to FIGS. 8A and 8B, the table member 22 in the embodiments herein can have opposing sides. The opposing sides can be first 38 and second 40 substantially planar surfaces. The first substantially planar surface 38 can be configured to face upward when the table member 22 is in the first position, with the second substantially planar surface 40 facing toward the floor 32. When the table member 22 is moved to the second position, and the support member 24 is located in its exterior position, the substantially planar surfaces are reversed so that the first substantially planar surface 38 faces the ground and the second substantially planar surface 40 faces upward.

The first substantially planar surface 38 can be configured for a typical indoor use use. Such uses include, but are not limited to, game surfaces, dining surfaces, desk tops, and the like. The second substantially planar surface 40 can be configured for outdoor use. Such uses include, but are not limited to, work surfaces, serving surfaces such as counters, game surfaces, dining surfaces, writing surfaces, bar surfaces, and the like. The surfaces and uses listed are not intended to be limiting and any surfaces or uses contemplated by one skilled in the art is within the scope of these embodiments.

One or both of the substantially planar surfaces 38, 40 can be embossed or indented with a pattern or patterns as desired or required. For example, one or both surfaces can be indented with a cup holder or a dinner tray shape. One or both of the surfaces can be embossed with a game board such as chess or backgammon, for example. The table member 22 can have apertures, for example, for holding tools or a grill top. These examples are not intended to be limiting and any embossing or indenting contemplated by one skilled in the art is with in the scope of these embodiments.

Figure 9A:
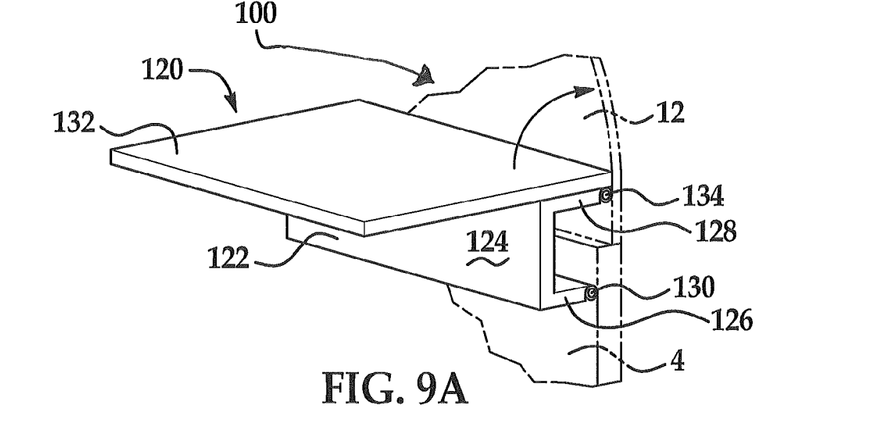
FIG. 9A is a perspective detail of another embodiment of a table assembly in an interior and first position.
Figure 9B:
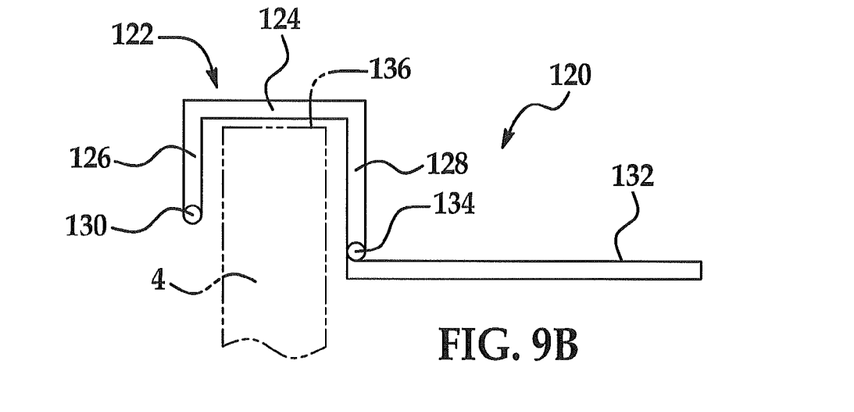
FIG. 9B is a side view of the embodiment in FIG. 9A in a second and exterior position.

Another embodiment of a vehicle with a table assembly is shown in perspective in an inside position in FIG. 9A, with a cross section of the table assembly in an outdoor or outboard position shown in FIG. 9B. The vehicle used to illustrate the embodiment is the same as that discussed above; therefore, the same reference numbers will be used for like elements.

The vehicle 100 (partially shown) comprises a vehicle body 4 or body structure enclosing at least a portion of a compartment 10 as described above. The body has an opening 14 permitting access to the compartment 10. A table assembly 120 for use both inside and outside the vehicle has a support member 122 having an elongated base 124 and first and second opposing substantially parallel sidewalls 126, 128 depending from the elongated base 124. The first sidewall 126 is coupled to the body 4 by a first pivot 130. The first pivot 130 is any mechanism known by those skilled in the art for joining components in a manner that permits rotational movement. The first pivot 130 permits the support member 122 to rotate from an interior position in which support member 122 is substantially within the compartment 10, to an exterior position in which at least a portion of the second sidewall 128 moves through the opening 14 from the compartment 10 to a location outside of the vehicle 100.

The table assembly 120 also has a table member 132 coupled to the support member 122 by a second pivot 134 located on the second sidewall 128. The second pivot 134 is any mechanism known by those skilled in the art for joining components in a manner that permits rotational movement. The table member 132 is configured to move about the second pivot 134 between a first position and a second position that is substantially perpendicular to the first position.

The table member 132 and support member 122 are configured and arranged so that the table member 132 is substantially horizontal and inside the compartment 10 when the table member 132 is in the first position and the support member 122 is in the interior position. In these positions, the second sidewall 128 can abut at least a portion of the table member 132. This abutting engagement can add support to the table member 132 in this position. This position is shown in FIG. 9A. The table assembly in this position in the vehicle is illustrated in FIG. 1. It is contemplated that the compartment 10 can comprise a storage compartment under the table member 132, such that the table member 132 is configured to cap the storage compartment when the table member 132 is in the first position.

In the second position, the table member 132 is substantially horizontal and outside of the vehicle 100 when the support member 122 is in the exterior position. A cross section of the table assembly 120 in this position is shown in FIG. 9B. The table assembly in this position in the vehicle is illustrated in FIG. 5.

In one embodiment of the table assembly 120 shown in FIG. 9B, the support member 122 can be configured; for example, with a substantially U-shaped cross section wherein the first and second sidewalls 126, 128 form the sides of the U-shape and the elongated base 124 is the bottom of the U-shape. The U-shape includes straight sides and a rounded bottom, straight sides and a flat bottom, bowl shaped, and the like. The opening 14 can include at least one bearing surface 136. The bearing surface 136 can be, for example, the width of the body 4 or a top surface of the body 4 forming the bottom of the opening 14. The body 4 can be reinforced as desired or required.

Figure 10:
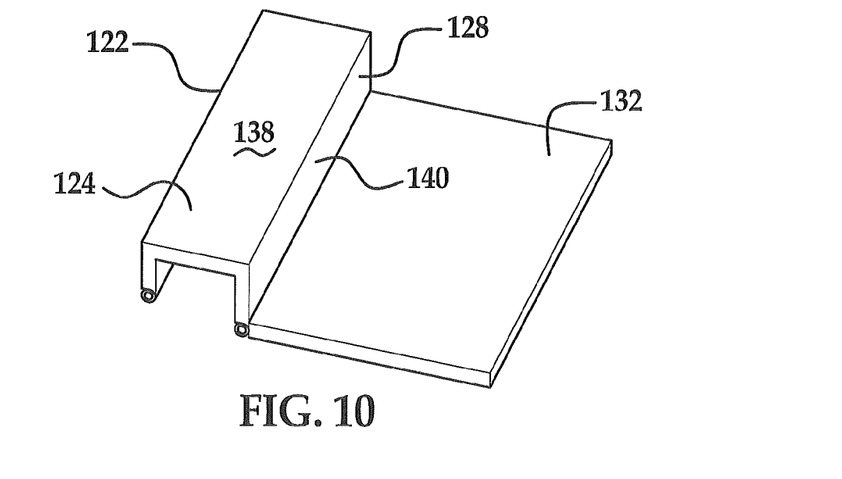
FIG. 10 is a perspective view of the embodiment in FIGS. 9A and 9B.

When the support member 122 is in the exterior position, the elongated base 124 can span the bearing surface 136 to provide a countertop surface. The second sidewall 128 will be substantially vertical, providing a backsplash surface adjacent to the table member 132. A perspective view of the support member 122 showing the countertop surface 138 and the backsplash 140 is illustrated in FIG. 10.

Figure 11A:
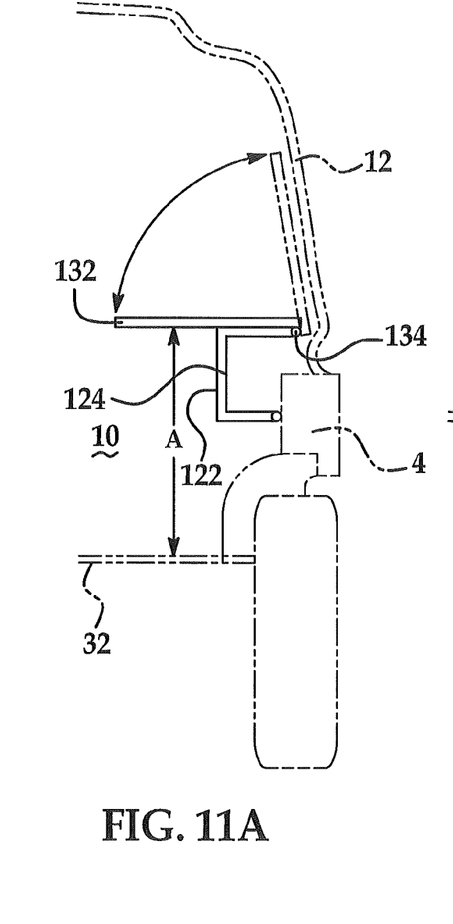
FIG. 11A is a cross sectional view of another embodiment of a vehicle with a table assembly in a first and interior position.
Figure 11B:
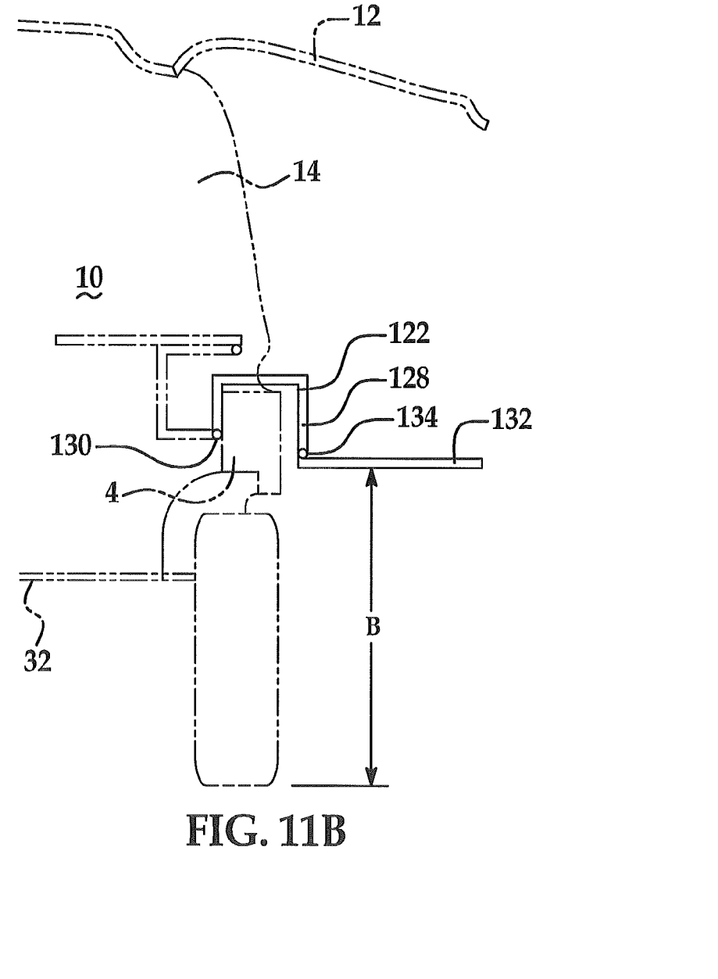
FIG. 11B is a cross sectional view of the embodiment in FIG. 11A with a table assembly in a second and exterior position.

Referring now to FIGS. 11A and 11B, the body 4 of the vehicle can define a floor 32 of the compartment 10. The elongated base 124 of the support member 122 can be sized such that when the support member 122 is in its interior position and the table member 132 is in its first position, the table member 132 can be configured to rest horizontally within a distance A of the floor. Distance A can be, for example, between about 25 and about 35 inches above the floor 32. Distance A is a height that is comfortable for use. This height is commensurate with typical table heights, and the table member 132 can be used as a typical table, for example, with the existing vehicle seats, pillows, folding chairs, and the like. The table member 132 is also capable of moving around the second pivot 134 to a third or stowage position, shown in shadow lines in FIG. 11A. The awning 12 is shown in the closed position for illustration, but can be in the open position.

In FIG. 11B, the awning 12 is shown in the open position, exposing the opening 14. The support member 122 can be rotated around the first pivot 130 so that the second pivot 134 moves through the opening 14, the support member 122 coming to rest in its exterior position. The table member 132 rotates approximately ninety degrees about the second pivot 134 until it is in its second position, which is substantially perpendicular to its first position and substantially horizontal to the ground. The second sidewall 128 of the support member 122 can have a width sized so that the distance of the table member 132 in the second position is within a distance B above grade. Distance B can be, for example, between about 30 and about 45 inches above the ground outside of the vehicle. Distance B is a height that is comfortable for use. This height is commensurate with counters or bars and can accommodate, for example, standing, counter stools, bar stools and the like. In any case, distance B can be greater than distance A. A bumper can also be incorporated with this embodiment as described herein as desired or require. Bumper 34 is illustrated in FIG. 8B.

Figure 12:
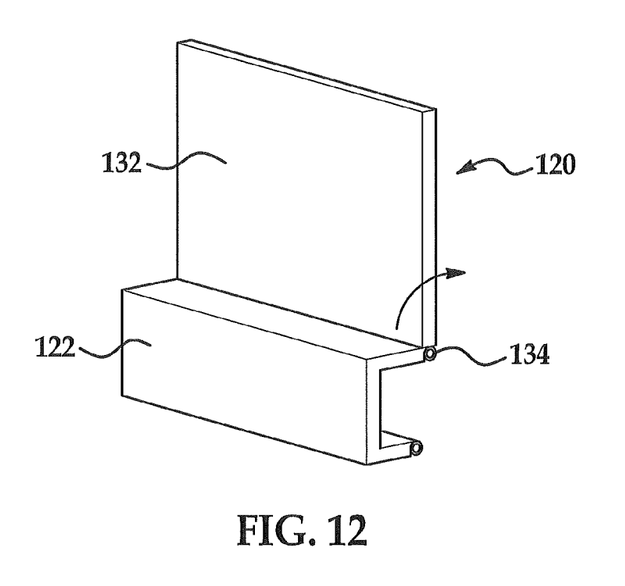
FIG. 12 is a perspective detail of another embodiment of a table assembly in an interior stowage position.

FIG. 12 is a perspective view of the table assembly 120 in the third or stowage position shown in FIG. 11A. In the stowage position, the support member 122 can be in the interior position within the vehicle. The table member 132 is rotated around the second pivot 134 approximately ninety degrees until it is substantially vertical. In the stowage position, the table member 132 is positioned to require the least amount of the compartment when it is not in use. It is contemplated that a securing member can be incorporated into the table assembly 120 to assist in maintaining the stowage position during travel as described earlier.

The table member 132 can also be in a stowage position when the support member 122 is in the exterior position. This position is shown in FIG. 6B. A shown in FIG. 6B, the table member 132 is rotated about the second pivot 134 from the second position approximately ninety degrees to its first position. With the support member 122 in the exterior position, the table member 132 is in a substantially vertical orientation and is effectively stowed to allow for more room when needed in the exterior of the vehicle. As discussed earlier, although not stored for travel, a securing member can be incorporated into the table assembly 120 to assist in maintaining the vertical orientation of the table member 132.

As discussed with reference to the earlier embodiments, the elongated base 124 and the first and second sidewalls 126, 128 of the support member 122 need not be solid, contiguous pieces. One or more of the base or sidewalls can contain apertures or be a frame support rather than a solid support.

As discussed with reference to FIGS. 8A and 8B, the table member 132 of the table assembly 120 can have first and second opposing sides. The description of the opposing sides is fully applicable to these embodiments and are therefore incorporated. The detailed description will not be repeated here.

Figure 13:
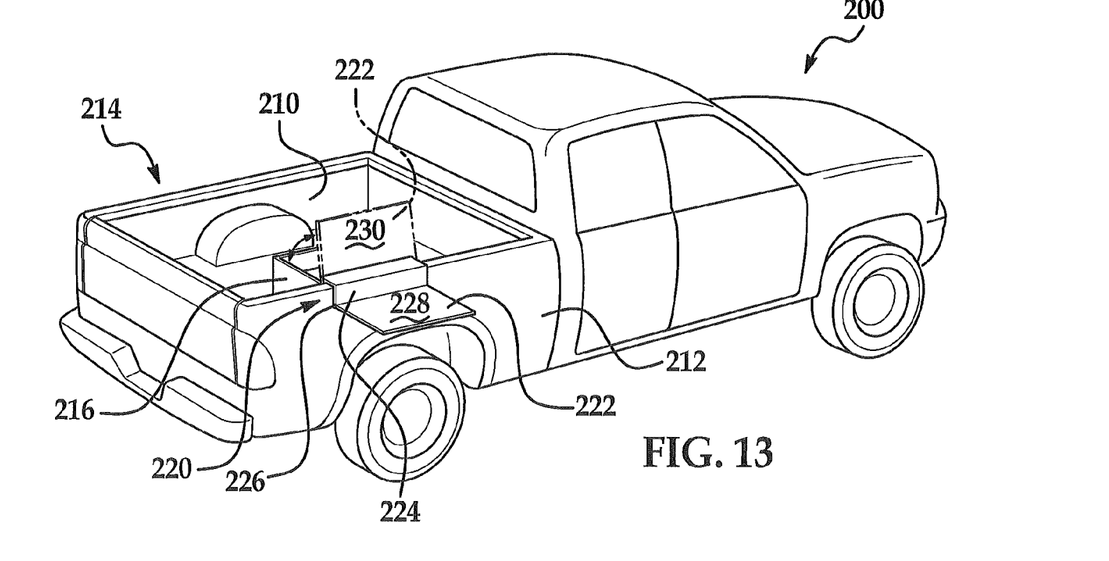
FIG. 13 is a perspective view of another embodiment of a vehicle with a table assembly.

Another embodiment of a vehicle 200 with a table assembly disclosed herein is illustrated in FIG. 13. This embodiment illustrates a vehicle with an open cargo area or open compartment 210 defined by the body 212 of the truck bed 214. In this embodiment, the open compartment 210 comprises a storage compartment or box 216 in the bed 214 of the truck 200 adjacent a portion of the body 212.

The vehicle 200 also comprises a table assembly 220 having a table member 222 and a support member 224. The table member 222 is configured as a lid for the storage box 216 when the table member 222 is in a first position. The support member 224 can be coupled to the interior of the body 212 by a first pivot (not shown). The first pivot is any mechanism known by those skilled in the art for joining components in a manner that permits rotational movement. The support member 224 can move about the first pivot from an interior position inside the bed 214 to an exterior position in which at least a portion of the support member 224 moves over the body 212 to a location outside of the bed 214.

The table member 222 can be coupled to the support member 224 so that it can move from the first position to a second position in which the table member 222 is located outside of the body 212 in a substantially horizontal orientation when the support member 224 has been moved to the exterior position.

FIG. 13 illustrates one embodiment of the support member 224 with a table member 222. An arrow shows the direction of movement of the table member 222 between capping the storage box 216 and rotating approximately ninety degrees about a second pivot 226 to a second position in which the storage box 216 is accessible. Moving the support member 224 about the first pivot to the exterior position while maintaining the table member 222 in the second position configures the table member 222 substantially parallel to the ground at approximately counter height for use as a work surface, game, surface, dining surface, etc.

In this embodiment, the table member 222 has opposing surfaces 228, 230. The opposing surfaces are similar to that described with reference to FIGS. 8A and 8B. The description of the opposing surfaces is fully applicable to this embodiment and is therefore incorporated. The detailed description will not be repeated here.

As described with reference to the other embodiments disclosed herein, the support member 224 need not be one or more solid, contiguous pieces. A portion or the entire support member 224 can contain apertures or be a frame and/or bracket support rather than a solid support.

The support member 224 in this embodiment is not limited to this configuration. It is contemplated that the support member 224 include at least one guide with cooperating track(s) on a bottom surface of the table member 222 to move the table member between the first and second positions.

An alternative embodiment of a table assembly used in vehicle 2 is described below. The table assembly is shown in perspective in an inside or inboard position in FIG. 1 and an outside or outboard position in FIG. 2. The vehicle used to illustrate the embodiment is the same as that discussed with reference to FIGS. 1 and 2. Therefore, only the embodiment of the table assembly 300 will be described in detail. When referring to the vehicle, FIGS. 1 and 2 can be referenced as the same reference numbers will be used for like elements.

The table assembly 300 comprises a vehicle body 4 or body structure and a table member 304 coupled to the body 4. The table member 304 is configured and arranged to move through the opening 14 of the vehicle 2 from a first position in which substantially all of the table member 304, including the distal end 305, is located inboard of the vehicle to a second position in which at least a portion of the table member 304, including the distal end 305, is located outboard of the vehicle 2. A cross-sectional view of this embodiment of the table assembly 300 is shown in FIG. 14.

The table assembly can further comprise a support member 302. The support member 302 can be any mechanism that maintains the table member 304 in a usable position. One example of the support member 302, shown in FIG. 14, can include at least one track 306 that runs along a bottom surface 308 of the table member 304 with cooperating guides 310 on the body 4 of the vehicle 2. The support member 302 also includes a movable arm 312 attached between the bottom surface 308 of the table member 304 on one end and the body 4 on the other end. As shown in FIG. 14, the table member 304 is in a first position supported by the arm 312 and the body 4 of the vehicle. In the first position, the table member 304 is in a substantially horizontal orientation. The support member 302 is in an interior position substantially inside the compartment 10.

Figure 14:
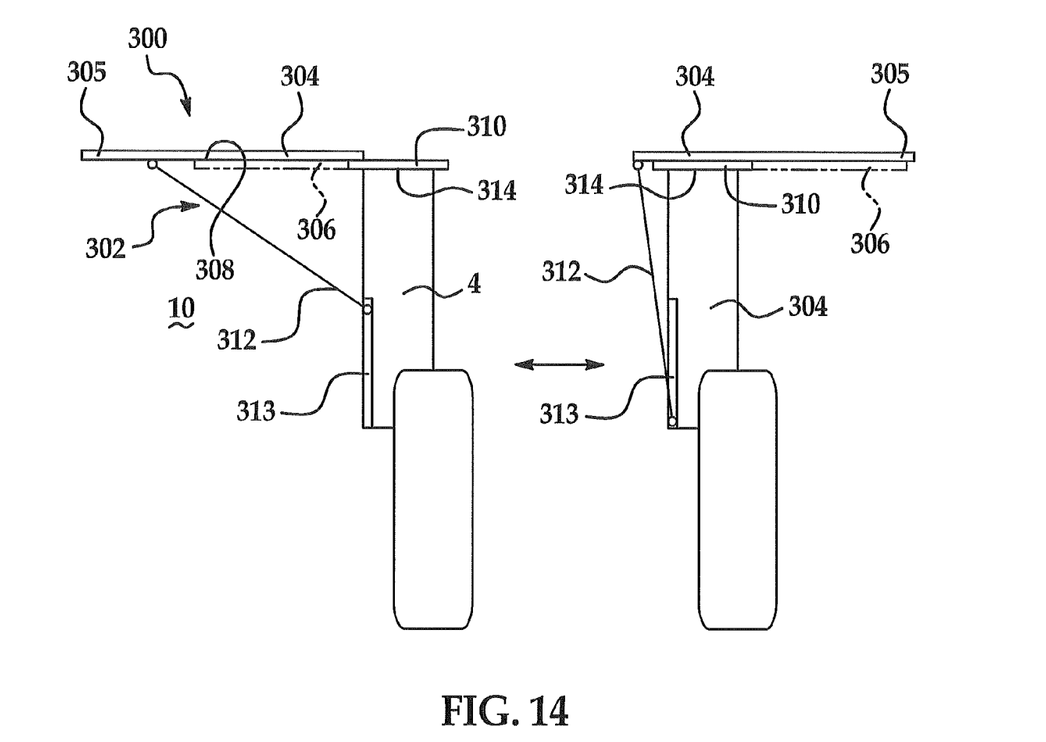
FIG. 14 is a cross sectional view of another embodiment of a table assembly in both an interior and exterior position.

In FIG. 14, the table assembly 300 moves to its outside position with the table member 304 moving to a second position and the support member moving to an exterior position. When the opening 14 is exposed, the table member 304 can be moved along the track 306 from the first position inside of the vehicle to the second position outside of the vehicle. The arm 312 moves along with the table member 304 until it is substantially vertical. The arm 312 of the support member 302 can be coupled to the bottom surface 308 of the table member 304 and the body 4 by pivots, for example, as discussed earlier. The arm 312 at the body can cooperate with a substantially vertical guide 313 on the body 4 with one or more locking positions so that the arm 312 can be adjusted as the table member 304 moves from the first to the second position. In the second position, the table member 304 is supported in part by the body 4 of the vehicle, and in particular a bearing surface 314 of the body 4. At least a part of the track 306 of the support member 302 moves through the opening 14 to the exterior position.

The table member 304 can be configured for a particular use. Such uses include, but are not limited to, a game surface, a dining surface, a desk top, a work surface and the like. The surfaces and uses listed are not intended to be limiting and any surfaces or uses contemplated by one skilled in the art is within the scope of these embodiments.

The table member 304 can be embossed or indented with a pattern or patterns as desired or required. For example, the table member 304 can be indented with a cup holder or a dinner tray shape or embossed with a game board such as chess or backgammon. The table member 304 can have apertures, for example, for holding tools or a grill top. These examples are not intended to be limiting and any embossing or indenting contemplated by one skilled in the art is within the scope of these embodiments.

The table assemblies disclosed herein are versatile components that can be included in the manufacture of the vehicle or can be retrofitted to existing vehicles. The table assemblies can be permanently installed, or can be installed to be removable. The table assembly can be made of any material known to one skilled in the art to perform as support members or table member surfaces. For example, the table assembly can be made from wood, laminate, composite, resin, plastic, metal, etc.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A table assembly for a vehicle, comprising:
   a vehicle body structure defining at least a portion of a compartment, the vehicle body structure having an opening permitting access to the compartment;
   a support member coupled to vehicle body structure and configured and arranged to move from an interior position in which the support member is substantially inboard of the vehicle body structure, to an exterior position in which at least a portion of the support member moves through the opening to a location outboard of the vehicle body structure;

a table member coupled to the support member and configured and arranged to move from a first position in which the table member is located inboard of the vehicle body structure, to a second position in which the table member is located outboard of the vehicle body structure; and a bumper attached to one of an outboard surface of the vehicle body structure and the support member, the bumper contacting the other of the outboard surface of the vehicle body structure and the support member when the support member is in the exterior position.

2. The table assembly of claim 1, wherein the vehicle body structure defines a floor of the compartment, wherein the table member is a first distance above the floor when in the first position and in a substantially horizontal orientation, wherein the table member is a second distance above grade when in the second position and in a substantially horizontal orientation, and wherein the first distance is less than the second distance.

3. The table assembly of claim 1, wherein the table member is configured and arranged to rotate approximately ninety degrees relative to the support member.

4. The table assembly of claim 1, wherein the table member is configured and arranged to rotate approximately ninety degrees from the first position to a substantially vertical stowage position.

5. The table assembly of claim 1, wherein the table member is coupled to the support member along a pivot axis and wherein the pivot axis is located on the portion of the support member that moves through the opening to the location outboard of the vehicle body structure.

6. The table assembly of claim 1, wherein the table member has opposing first and second substantially planar surfaces, the first substantially planar surface configured to face upward when the table member is in the first position, and the second substantially planar surface configured to face upward when the table member is in the second position.

7. The table assembly of claim 1, further comprising:
a closure panel movable between open and closed positions, wherein the closure panel at least partially conceals the opening in the vehicle body structure when in the closed position.

8. A table assembly for a vehicle, comprising:
a vehicle body structure defining at least a portion of a compartment, the vehicle body structure having an opening permitting access to the compartment;
a support member coupled to vehicle body structure and configured and arranged to move from an interior position in which the support member is substantially inboard of the vehicle body structure, to an exterior position in which at least a portion of the support member moves through the opening to a location outboard of the vehicle body structure; and
a table member coupled to the support member and configured and arranged to move from a first position in which the table member is located inboard of the vehicle body structure, to a second position in which the table member is located outboard of the vehicle body structure;
wherein the vehicle body structure defines a compartment and wherein the compartment is an open-topped cargo bed.

9. The table assembly of claim 8, wherein the vehicle body structure defines a floor of the compartment, wherein the table member is a first distance above the floor when in the first position and in a substantially horizontal orientation, wherein the table member is a second distance above grade when in the second position and in a substantially horizontal orientation, and wherein the first distance is less than the second distance.

10. The table assembly of claim 8, wherein the table member is configured and arranged to rotate approximately ninety degrees relative to the support member.

11. The table assembly of claim 8, wherein the table member is configured and arranged to rotate approximately ninety degrees from the first position to a substantially vertical stowage position.

12. The table assembly of claim 8, wherein the table member is coupled to the support member along a pivot axis and wherein the pivot axis is located on the portion of the support member that moves through the opening to the location outboard of the vehicle body structure.

13. The table assembly of claim 8, further comprising:
a bumper attached to one of an outboard surface of the vehicle body structure and the support member, the bumper contacting the other of the outboard surface of the vehicle body structure and the support member when the support member is in the exterior position.

14. The table assembly of claim 8, wherein the table member has opposing first and second substantially planar surfaces, the first substantially planar surface configured to face upward when the table member is in the first position, and the second substantially planar surface configured to face upward when the table member is in the second position.

15. The table assembly of claim 8, wherein the support member has an elongated base and first and second opposing substantially parallel sidewalls depending from the base, the first sidewall is coupled to the vehicle body structure, and the second sidewall is coupled to the table member.

16. The table assembly of claim 8, further comprising:
a closure panel movable between open and closed positions, wherein the closure panel at least partially conceals the opening in the vehicle body structure when in the closed position.

17. A table assembly for a vehicle, comprising:
a vehicle body structure defining at least a portion of a compartment, the vehicle body structure having an opening permitting access to the compartment;
a support member coupled to vehicle body structure and configured and arranged to move from an interior position in which the support member is substantially inboard of the vehicle body structure, to an exterior position in which at least a portion of the support member moves through the opening to a location outboard of the vehicle body structure; and
a table member coupled to the support member and configured and arranged to move from a first position in which the table member is located inboard of the vehicle body structure, to a second position in which the table member is located outboard of the vehicle body structure;
wherein the support member has an elongated base and first and second opposing substantially parallel sidewalls depending from the base, the first sidewall is coupled to the vehicle body structure, and the second sidewall is coupled to the table member.

18. The table assembly of claim 17, wherein the second sidewall abuts the table member when the table member is in the first position.

19. The table assembly of claim 17, wherein the support member defines a substantially U-shaped cross section, and wherein the opening includes at least one load bearing surface, wherein the support member is configured so that when the support member is in the exterior position, the base spans the bearing surface to provide a countertop surface and the second sidewall is substantially vertical to provide a backsplash surface adjacent to the table member.

20. The table assembly of claim 17, wherein the vehicle body structure defines a floor of the compartment, wherein the table member is a first distance above the floor when in the first position and in a substantially horizontal orientation, wherein the table member is a second distance above grade when in the second position and in a substantially horizontal orientation, and wherein the first distance is less than the second distance.

21. The table assembly of claim 17, wherein the table member is configured and arranged to rotate approximately ninety degrees relative to the support member.

22. The table assembly of claim 17, wherein the table member is configured and arranged to rotate approximately ninety degrees from the first position to a substantially vertical stowage position.

23. The table assembly of claim 17, wherein the table member is coupled to the support member along a pivot axis and wherein the pivot axis is located on the portion of the support member that moves through the opening to the location outboard of the vehicle body structure.

24. The table assembly of claim 17, further comprising:
a bumper attached to one of an outboard surface of the vehicle body structure and the support member, the bumper contacting the other of the outboard surface of the vehicle body structure and the support member when the support member is in the exterior position.

25. The table assembly of claim 17, wherein the table member has opposing first and second substantially planar surfaces, the first substantially planar surface configured to face upward when the table member is in the first position, and the second substantially planar surface configured to face upward when the table member is in the second position.

26. The table assembly of claim 17, wherein the vehicle body structure defines a compartment and wherein the compartment is an open-topped cargo bed.

27. The table assembly of claim 17, further comprising:
a closure panel movable between open and closed positions, wherein the closure panel at least partially conceals the opening in the vehicle body structure when in the closed position.

28. A table assembly for a vehicle, comprising:
a vehicle body structure;
a table member coupled to the vehicle body structure and configured and arranged to move from a first position in which a distal end of the table member is located inboard of the vehicle body structure, to a second position in which the distal end of the table member is located outboard of the vehicle body structure; and
a support member pivotally coupled to both the vehicle body structure and the table member, wherein the support member is configured and arranged to move from an interior position in which the support member is substantially inboard of the vehicle body structure, to an exterior position in which at least a portion of the support member is located outboard of the vehicle body structure;
wherein the support member has an elongated base and first and second opposing substantially parallel sidewalls depending from the base, the first sidewall is coupled to the vehicle body structure, and the second sidewall is coupled to the table member; and
wherein the second sidewall abuts the table member when the table member is in the first position.

29. The table assembly of claim 28, wherein the vehicle body structure defines a floor of a compartment, wherein the table member is a first distance above the floor when in the first position and in a substantially horizontal orientation, wherein the table member is a second distance above grade when in the second position and in a substantially horizontal orientation, and wherein the first distance is less than the second distance.

30. The table assembly of claim 28, wherein the table member is pivotally coupled to the vehicle body structure and is configured and arranged to rotate approximately ninety degrees to a substantially vertical stowage position.

31. The table assembly of claim 28, wherein the table member has opposing first and second substantially planar surfaces, the first substantially planar surface configured to face upward when the table member is in the first position, and the second substantially planar surface configured to face upward when the table member is in the second position.

32. The table assembly of claim 28, wherein the table member is configured and arranged to rotate approximately ninety degrees relative to the support member.

* * * * *